U nited States Patent Office 2,693,222
Patented Nov. 2, 1954

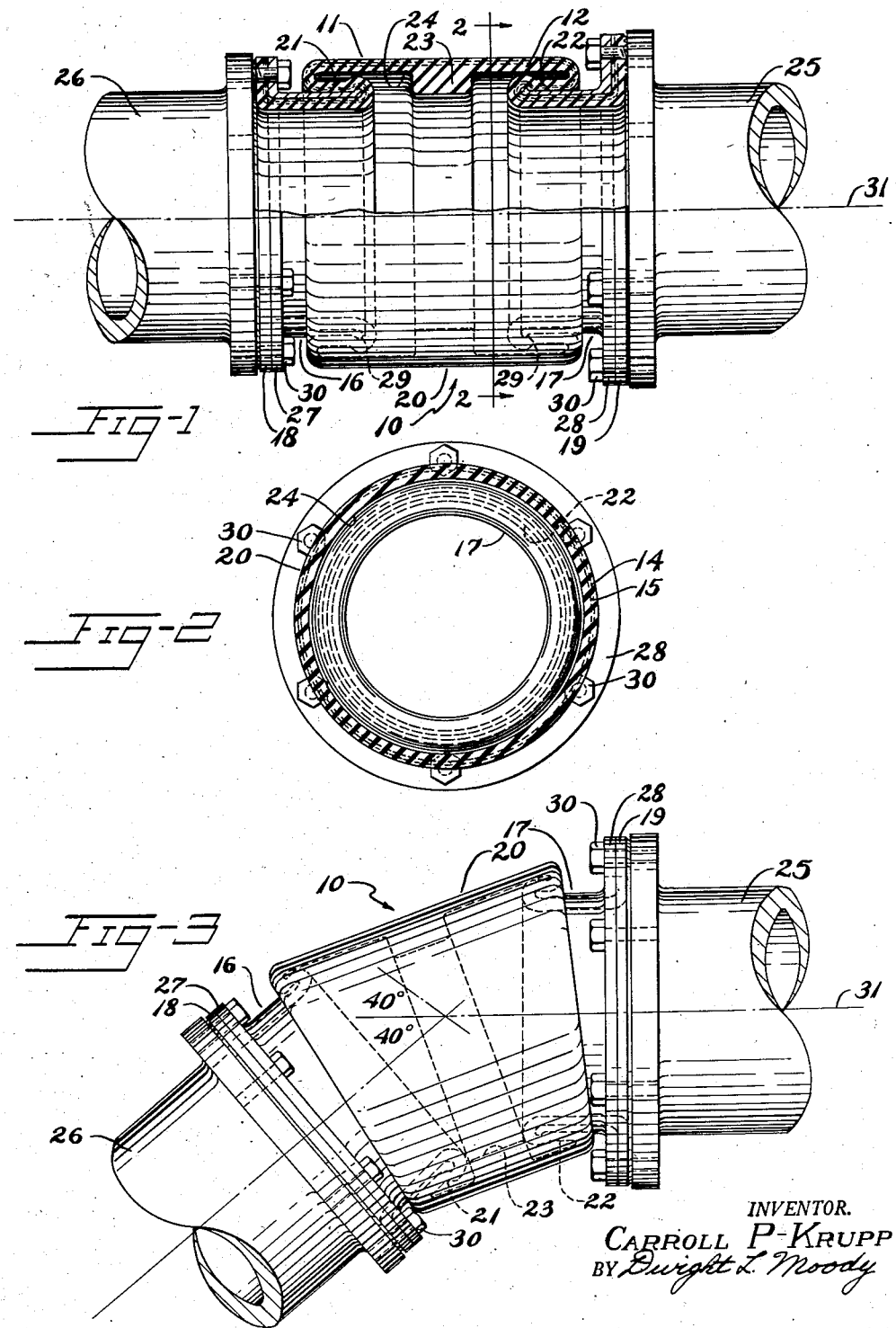

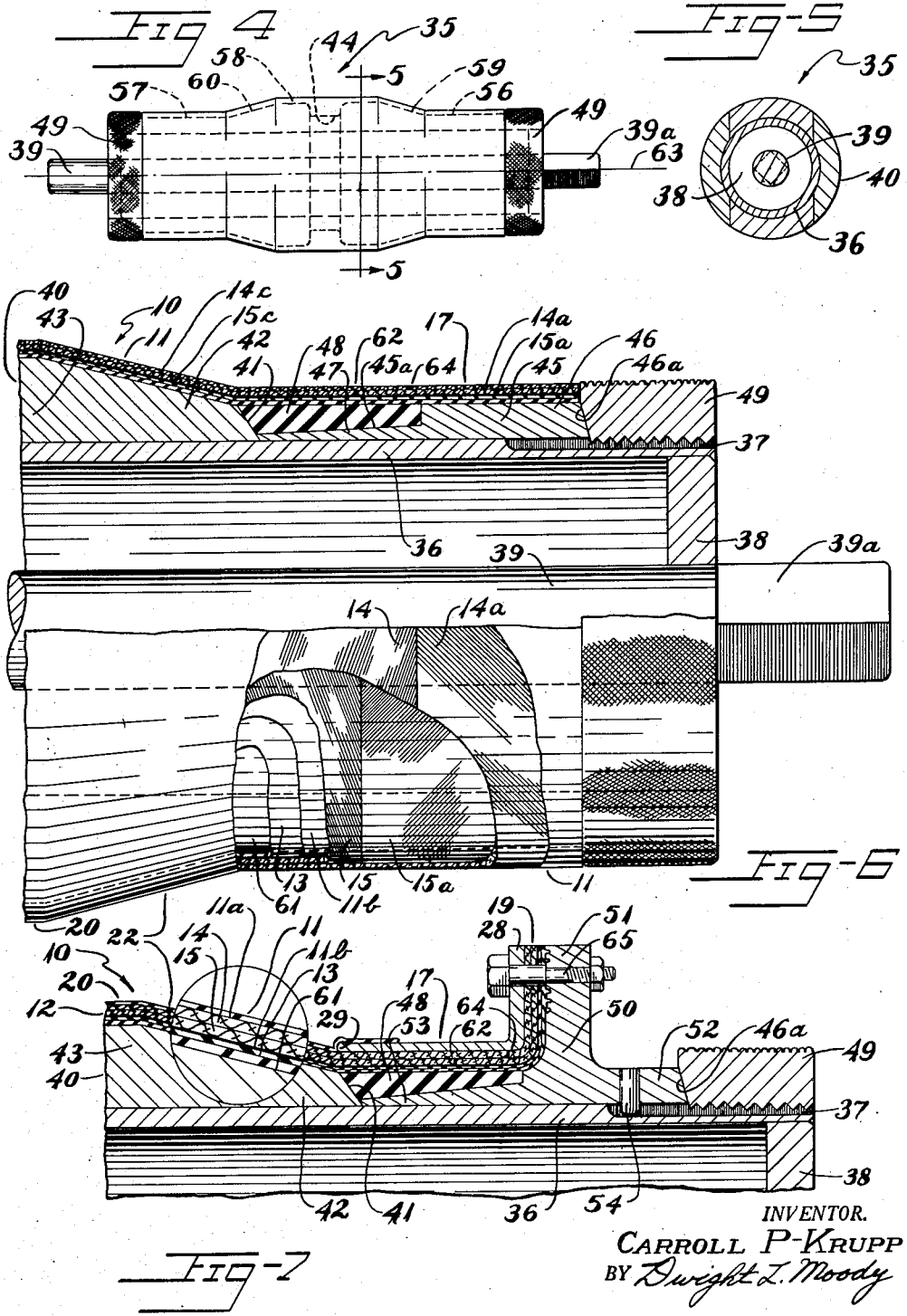

2,693,222

APPARATUS FOR MAKING FLEXIBLE HOLLOW CONNECTIONS

Carroll P. Krupp, Cuyahoga Falls, Ohio, assignor to The B. F. Goodrich Company, New York, N. Y., a corporation of New York Application April 29, 1953, Serial No. 351,896

7 Claims. (Cl. 154—1.8)

The invention relates to flexible connections, or joints, or couplings for joining adjacent parts or ends of hollow members subject to internal fluid pressure, and it pertains more particularly to apparatus for making flexible hollow connections each capable of a wide range of relative tilting movement in all directions of opposite end portions thereof and capable of withstanding internal fluid pressures.

This application is a division of my copending application Serial No. 272,752, filed February 21, 1952, wherein the flexible hollow connections are claimed.

Heretofore, ordinary sleeve type or bellows type flexible connections or joints have been generally used to interconnect adjacent ends of tubular elements or conduits containing or conducting fluid under pressure and subject to vibratory, tilting or other relative movement. The prior connections have not been wholly satisfactory for the intended purpose because of their tendency to bulge outwardly and stiffen objectionably and resist flexure in all directions under internal fluid pressure, and because of their inability to accommodate relative axial separating movement and relative tilting movement of the adjacent conduits. Also, the prior connections have bursted or had other structural failure under some internal fluid pressure conditions, and have been unable to withstand satisfactorily liquid or gaseous fuels, extensive flexure, vibration, low temperatures, sunlight, weather, and other deteriorating conditions encountered in service.

An object of the invention is to provide for overcoming the foregoing and other disadvantages of the prior flexible connections or joints.

Other objects of the invention are to provide an improved flexible hollow connection or joint for joining adjacent parts of hollow members, or tubular elements, or conduits, or the like; to provide improved apparatus for making the connection and to provide for separability of elements of the apparatus, that is, apparatus of the collapsible type; to provide for essentially free floating action of the connection axially thereof with little or no increase or decrease in overall transverse dimensions of the connection; to provide for avoiding substantial outward bulging of the connection intermediate its ends under internal pressure conditions; to provide for a wide range of tilting movement in all directions of one end portion of the connection relative to the other end portion for facilitating universal type swinging movement of the joined tubular elements of conduits relative to one another; to provide for rolling movement and flexure of axially spaced-apart portions of the connection and for substantially equalizing the rolling movement and flexure of one of the portions relative to the other under tilting of the connection; and to provide for simplicity and durability of construction, convenience of manufacture, and for effectiveness of operation.

Further objects are to provide for uniformity of strength of the wall of the connection throughout its zones of rolling movement and flexure; to provide for resistance to burst under internal fluid pressure, especially high liquid pressure; to provide for imperviousness to fluids and resistance to deterioration from low temperatures and liquid or gaseous fuels such, for example, as kerosene, gasoline, oil, natural or artificial gas, or the like; and to provide for electrical conductivity of the connection.

These and other objects and advantages of the invention will be apparent from the following description.

In the accompanying drawings which form a part of this specification,

Fig. 1 is a side elevational view of a flexible hollow connection interconnecting adjacent ends of axially aligned conduits, and constructed in accordance with and embodying the invention, parts being broken away and in section, Fig. 2 is a cross-sectional view taken along line 2—2 of Fig. 1, Fig. 3 is a side elevational view like Fig. 1 but showing the connection flexed to accommodate a tilted disposition of the conduits, Fig. 4 is a side elevational view in a reduced scale of the connection at one stage of its manufacture and assembly on mandrel apparatus, Fig. 5 is a cross-sectional view taken along line 5—5 of Fig. 4 showing only the mandrel apparatus, Fig. 6 is a side elevational view in an enlarged scale of the right hand end portion of the connection and mandrel apparatus assembly shown in Fig. 4, parts being broken away and in section, and Fig. 7 is a side elevational view in an enlarged scale like Fig. 6, but showing the connection in a subsequent stage of manufacture and ready for vulcanization on the mandrel apparatus, parts being broken away and in section.

The illustrative embodiment of the invention shown especially in Figs. 1 to 3, inclusive, has a hollow or tubular body 10 open at both ends and having a continuous annular wall of flexible material, which wall is impervious to gases and liquids and resists substantial stretching and outward bulging transversely of the body. Also, the wall is resistant to bursting under internal fluid pressures and to aging, cracking, abrasion, weather, sunlight and ozone, and is capable of withstanding extremely low temperatures and deterioration from kerosene, gasoline, oil, or other fuels of the liquid or gaseous type.

The tubular body 10 may be made of an elastic composition 11 of rubber, natural or synthetic, or other rubber-like material having substantially similar chemical composition or physical properties to natural rubber and to equivalents therefor. The elastic composition 11, in the preferred construction, is in part of resilient, natural rubber composition and in part of an oil-resistant rubbery copolymer of butadiene with acrylonitrile, and has a continuous, annular stretch-resisting reinforcement 12 capable of extensive flexure yet highly resistant to outward bulging. The reinforced elastic wall of the body 10 may have an electrically conductive, continuous, annular, thin outer layer 11a of elastic composition having particles of conductive material therein for electrical grounding purposes; and the wall has directly beneath the reinforcement 12, as shown especially in Fig. 7, a continuous, annular, thin layer 13 of nylon material constituting a barrier substantially impenetrable to liquid or gaseous fuel.

The reinforcement 12 may be formed of two plies 14 and 15 of weftless or substantially weftless cord fabric sheet material desirably coated with suitable elastic composition and disposed in superimposed, face-to-face relation and bonded one to the other and to adjacent elastic composition 11. The cord fabric sheet material may be coated, as by calendering, on both sides with an unvulcanized resilient, natural rubber composition, and may be made of filamentary material of rayon, nylon, cotton, silk, glass fibers or combinations thereof. Preferably the sheet material is made of rayon cords.

For resisting substantial outward bulging and avoiding objectionable increase or decrease in overall outside diameter of the tubular body 10 under internal fluid pressure and lateral and longitudinal flexure, the cords in the outer ply 14 are disposed spirally in the wall of the body 10 so that for the axially aligned condition of the connection shown in Fig. 1, each cord extends along a path steeply inclined to the longitudinal axis indicated by the numeral 31. Preferably, each cord throughout approximately the major part of the length of the body 10 is inclined initially about 70 degrees to the horizontal plane passing through the axis 31, whereby the cords at the intermediate cylindrical region of greatest diameter of the body 10 are normally at an angle of about 20 degrees to the vertical plane passing perpendicularly through the axis 31. The cords of the outer ply 14 may be inclined in the direction toward the right-hand end of the connection. Similarly, the inner ply 15 has its spirally arranged cords inclined about 20 degrees to the vertical plane passing perpendicularly through the axis 31, but inclined in the opposite direction toward the left-hand end of the connection.

The oppositely inclined cords of the two reinforcing plies 14, 15 although largely surrounded by resilient rubber material, mutually cooperate to resist objectionable outward bulging of the connection at its intermediate cylindrical region, while facilitating rolling movement and extensive flexure of spaced-apart, circumferentially continuous, double reversed fold portions 21, 22 of the annular wall of the tubular body 10. This makes feasible a free floating action of the connection by virtue of relative axial rolling and flexing movement of the spaced-apart double reversed fold portions of the connection, together with extensive tilting movement in all directions of one end portion 16 of the connection relative to the other end portion 17.

The tubular body 10 has the material of its continuous annular wall at each portion 21, 22 infolded axially and then out-folded axially i. e. double reverse folded upon itself so that it is of generally S-shaped section at zones spaced axially inward from the ends of the body and so that the S-fold portions 21, 22 merge with attaching or connecting or end portions 16, 17 of substantially uniform, reduced diameter which terminate desirably in continuous, annular outward flanges 18, 19. At the intermediate cylindrical region of the body 10, a portion 20 of substantially uniform and relatively greater diameter than that of the attaching or end portions 16, 17 extends from fold portion 21 to fold portion 22 and between such end portions in laterally spaced, overlapping relation to at least parts of the end portions, as shown especially in Fig. 1, to accommodate the fold portions 21, 22 of flattened, generally S-shaped section. The S-fold portions interconnect and coact with the intermediate portion 20 to provide for independent axial rolling movement and flexure of the connection at spaced-apart zones thereof inwardly of its ends.

A continuous, annular ring stop 23 of suitable elastic composition and desirably rectangular section is mounted within the bore 24 of the tubular body 10 in integrally united relation to the cylindrical wall of the intermediate portion 20 midway between the ends of the connection. Although the ring stop 23 may be eliminated for those applications of the connection requiring relatively lesser tilting movement, the ring stop 23 is an important element of the connection wherein extensive all-directional tilting or universal joint action and substantial relative axial movement are required. The construction and arrangement of the ring stop within and midway of the connection makes feasible substantial equalization of the rolling movement and flexure of the laterally compact S-fold portions 21, 22 together with the parts of the intermediate portion 20 to each side of the ring stop 23, as shown especially in Fig. 3. The ring stop 23 also functions to establish the maximum degree of angular movement or tilting of one end portion 16 relative to the other end portion 17, which angular movement, for the particular embodiment shown, may be, for example, a total of about 80° as indicated in Fig. 3.

For facilitating the attachment of the flexible connection to adjacent flanged ends of tubular elements or conduits 25, 26, the tubular end portions 16, 17 of reduced diameter are provided with attaching-reinforcing rings 27, 28 of stiff metal such, for example, as aluminum, steel, or the like. The attaching-reinforcing rings 27, 28 are of similar continuous, annular construction except for a right-hand and left-hand arrangement thereof; hence only the construction of ring 27 will be described in detail.

The ring 27 may be of L-shaped section providing a continuous, annular flange extending laterally outward of the connection in overlying, backing and bonded relation to the flange 18 of the end portion 16, as shown especially in Fig. 1. The base of the L-shaped ring 27 extends axially inward along the end portion 16 in overlying bonded relation thereto to stiffen and prevent outward bulging of the portion 16, and terminates at its inner end in a continuous, annular bead 29 of generally circular section and increased thickness, so that the flexing and stretching stresses in the elastic fold portion 21 about the bead 29 are distributed rather than highly localized. Frequent flexing of the connection is thus made feasible with little or no danger of structural failure and cracking of the elastic composition at the region of the bead 29.

The flanges of both the hollow body 10 and the attaching-reinforcing rings 27, 28 may be provided with circumferentially spaced-apart apertures for receiving threaded bolt fasteners 30, 30 which threadedly engage the flanged ends of the conduits 25, 26.

When the flexible connection joins the conduits 25, 26 as shown especially in Figs. 1, 2, and 3, it accommodates axial movement of the conduits toward and away from one another and also relative tilting of the conduits by virtue of the coincidental axial rolling movement and lateral flexure of the S-fold portions 21, 22 and the progressive lateral flexure of the wall of the intermediate cylindrical portion 20 to each side of the ring stop 23.

In the operation of the connection, the two ply weftless cord fabric reinforcement 12 of the tubular body 10 resists objectionable change in diameter and outward bulging at the intermediate cylindrical portion 20; because the cords of one ply 14 are diagonally disposed in a direction opposite that of the diagonally disposed cords of the other ply 15, that is the cords are crisscrossed, and hence coact to prevent objectionable increase or decrease in overall diameter of the body at its intermediate portion 20. This cord arrangement also makes feasible the combined telescopic or axial rolling movement and flexure of the connection; since the diagonal cords of the respective plies 14, 15 are each yieldably surrounded by the elastic composition which together with the weftless arrangement of the cords permits slight changes in the initial side-by-side spacing and angular relationship of the cords, whereby the cords adjust themselves to such spacing and angular dispositions as are required to accommodate the axial rolling and unrolling movement of the S-fold portions of the tubular body 10 and to accommodate the required change in diametrical position of points on the respective cords at the S-fold portions 21, 22 resulting from the rolling movement.

Thus, the flexible connection is essentially free floating in its functioning so that there is little or no restraint to relative axial shifting of the end portions 16, 17 of the connection and the conduits 25, 26, all without objectionable change in diameter of the intermediate portion 20. Also, the flexible connection has provision for relative tilting in all directions of the end portions 16, 17, as shown especially in Fig. 3, and for the specific construction shown the maximum degree of tilting, established largely by the disposition and width of the ring stop 23, may be about 40° to any one side of the longitudinal axis 31, whereby a maximum range of about 80° angular tilting of the end portion 16 and conduit 26 relative to the end portion 17 and conduit 25 is provided. When the ring stop 23 contacts the ring-reinforced end portions 16, 17 at the beads 29, 29, as shown in Fig. 3, it resists further angular tilting, and at the same time, compels substantially equal axial rolling movement and lateral flexure of the S-fold portions 21, 22 and the adjacent parts of the intermediate cylindrical portion 20 to the sides of the ring stop 23 completely about the periphery of the tubular body 10. This advantageously prevents jamming resulting from objectionable one-sided rolling movement and flexure of the wall of the body 10 toward one end of the connection.

The hereinabove described functioning of the flexible connection may be likened to the functioning of the wall of an inflated balloon when indented inwardly as by a finger. The finger can move axially under increased force applied axially and is free to tilt in any direction in the manner of a universal joint by virtue of the flexibility and rolling action of the distended wall of the balloon adjacent and outwardly of the end of the finger.

Such universal joint functioning of the flexible connection is advantageous for interconnecting adjacent ends of conduits or pipe sections such, for example, as those of a flying boom utilized for in-flight refueling of aircraft. In the application of the flexible connection to the flying boom, it is essential to provide for not only relative axial or telescopic movement of the connection, but also for tilting movement throughout a relatively wide range of degrees, so as to accommodate relative movements of the flying aircraft. The flexible connection described hereinabove has these features and has been found to resist structural failure under low temperature conditions and high fluid pressures on the order of about 300 lbs. p. s. i. The electrically conductive elastic outer coating 11a advantageously facilitates electrically grounding the connection to avoid dangerous sparks during the refueling operation.

The invention provides improved mandrel apparatus 35 of the collapsible type shown in Figs. 4 to 7, inclusive, for making the flexible connection in accordance with the procedural aspects of the invention. The mandrel apparatus includes a rigid tubular support 36 of steel or other suitable stiff, strong material resistant to distortion under temperatures from about 200° to about 300° F., and having a continuous annular wall of substantially uniform outside diameter, which wall has fine exterior threads and an axially-extending slot 37 at each end of the support. The tubular support 36 has sufficient length to accommodate the desired length of the hollow body 10 in its fully extended non-flanged condition shown in Figs. 4 and 6. The respective ends of the tubular support 36 are closed by centrally apertured, circular end plates 38, 38 of steel carrying fixedly a solid steel round rod 39 extending axially within the support and projecting beyond the end plates 38, 38 for facilitating the assembly and manipulation of the mandrel apparatus. A projecting end portion 39a of the rod may be of square section for tool-engaging purposes.

A rigid tubular sectional main body or mandrel 40 of aluminum or other suitable material is detachably mounted on the tubular support 36 with end faces 41, 41 of the mandrel spaced substantially and axially inward from the threaded ends of the support 36, as shown especially in Fig. 6. The annular wall of the mandrel 40 has a substantially uniform inner diameter for sliding fit with the exterior cylindrical surface of the support 36.

The wall of the mandrel 40 includes spaced-apart end portions 42, 42 of axially outward tapered section terminating in the oppositely and steeply inclined end faces 41, 41, which tapered end portions are of sufficient axial length to provide for making the S-fold portions 21, 22 of the hollow body 10 in their fully extended condition. The wall of the mandrel 40 has an intermediate portion 43 of substantially uniform outside diameter extending continuously between the oppositely tapered end portions 42, 42 and having sufficient diameter and axial length to provide for making the cylindrical intermediate portion 20 of the hollow body 10. The intermediate portion 43 has in its outer surface a continuous annular groove 44 desirably of rectangular section, located midway between the tapered end portions 42, 42 to provide for making the ring stop 23.

As shown especially in Fig. 5, the annular wall of the mandrel 40 is split or divided longitudinally from end face 41 to end face 41 at spaced-apart, parallel vertical planes extending along and to opposite sides of the longitudinal axis of the mandrel, that is, at a plurality of positions circumferentially spaced-apart. Thus a plurality of individual sections of the wall normally in side-by-side abutting relation on the support 36 are provided to facilitate by relative sliding movement of the sections, the disassembly and removal of the mandrel 40 from the tubular support 36 for collapsibility of the apparatus.

For use during an initial stage of making the hollow body 10, there is provided at each end of the mandrel 40 an expander structure including a rigid expander collar 45 of aluminum or other suitable material matingly abutting an end face 41 of the mandrel and having a substantially uniform internal diameter for sliding fit with the exterior surface of the tubular support 36. The expander collar 45 has an axial length sufficient to provide for making an end portion 16, 17 including its outward flange 18, 19 of the hollow body 10. The wall of the expander collar is continuously annular and has a portion 46 of substantially uniform outside diameter with a steeply inclined end face 46a for disposition nearest the end of the tubular support 36, and has a portion 47 of reduced outside diameter and axially inward tapered section for disposition nearest an end face 41, 41 of the tubular mandrel 40. The offset tapered construction of the expander collar 45 provides with the tubular mandrel 40 an annular recess 45a of truncated cone section overlying the portion 47 for receiving an expander ring 48 of suitable vulcanized elastic composition and of truncated cone section.

The expander ring 48 of the expander structure is dimensioned so as to provide with the expander collar 45 an end portion of substantially uniform outside diameter at each end of the mandrel apparatus and of reduced outside diameter relative to the intermediate portion 43. Thus, the tubular sectional mandrel 40, expander collars 45, 45 and expander rings 48, 48, when in assembled relation as shown especially in Fig. 6, have an overall length and diameter sufficient to provide for making the hollow or tubular body 10 of the length and diameter required to make feasible the flanged end and S-fold construction of the flexible connection shown especially in Fig. 1.

A hand nut 49 of suitable metal material has a knurled or otherwise roughened outer peripheral surface for handling purposes and an interiorly threaded bore so as to threadedly engage the fine threads at an end of the tubular support 36 and also has a steeply inclined end face for mating contact with the inclined end face 46a of the collar 45. The hand nuts 49, 49 at the ends of the support 36 securely clamp and hold together the tubular sectional mandrel 40, the expander collars 45, 45 and the expander rings 48, 48 in assembled relation upon the tubular support 36.

The mandrel apparatus described hereinabove, when arranged in the assembled condition shown especially in Fig. 6, is utilized for the initial stage of manufacture of the hollow or tubular body 10. However, for a later stage of manufacture, the mandrel apparatus is modified as shown in Fig. 7, so as to include at each of its ends a different expander collar 50 having an apertured, circumferentially grooved, radially extending, annular flange 51 at its portion 52 which portion 52 is of substantially uniform outside diameter slightly greater than that of the cylindrical portion 46 of the first expander collar 45. The second expander collar 50 has an offset tapered portion 53 similar to that of the tapered portion 47 of the expander collar 45 but of slightly increased radial thickness. The expander collar 50 at its portion 52 has a radially disposed pin 54 of steel, for example, projecting radially inward and adapted to seat in and slide along the slot or keyway 37 of the tubular support 36 for preventing relative rotative movement of the collar.

The second expander collars 50, 50 and the elastic expander rings 48, 48 together with the other parts of the modified mandrel apparatus shown in Fig. 7, maintain radially outward pressure on the connecting or end portions 16, 17 of the hollow body 10 during its vulcanization. Moreover, the modified mandrel apparatus facilitates the provision of the flanged construction of the end portions 16, 17 of the hollow body 10 and the bonding of the L-shaped reinforcing rings 27, 28 to the end portions 16, 17 in overlying relation therewith to stiffen them against objectionable outward bulging and to facilitate their attachment to the conduits 25, 26.

To produce the flexible connection the mandrel apparatus is first assembled using expander collars 45, 45 and expander rings 48, 48 as shown especially in Fig. 6. The apparatus thus has a contoured outer surface constituted by spaced-apart cylindrical end zones 56, 57 of substantially uniform diameter, an intermediate or central zone 58 of substantially uniform and relatively greater diameter spaced from the end zones, and conical zones 59, 60 interconnecting the end zones 56, 57 and the central zone 58. The entire outer surface of the mandrel apparatus at its respective zones and in the annular groove 44, is next coated with silicone oil or other suitable non-bonding material to prevent adherence of the elastic composition of the hollow body 10 to the apparatus during vulcanization. A filler strip of suitable cross-section and unvulcanized, oil-resistant, rubbery copolymer of butadiene with acrylonitrile is wound or placed in the groove 44 so that the outer peripheral surface of the strip is flush with the outer surface at the central zone 58. The filler strip when formed and vulcanized, is bonded to the hollow body 10 and constitutes the ring stop 23 of the flexible connection.

A thin sheet 61 of suitable unvulcanized, oil-resistant, rubbery copolymer of butadiene with acrylonitrile and without fabric reinforcement therein is formed or wrapped once conformingly about the outer surface of the mandrel apparatus, which sheet extends continuously from one hand nut 49 to the other hand nut 49 and constitutes an inner protective layer of the elastic composition 11. Liquid nylon material in a suitable liquid, evaporative, carrying medium is then brushed or sprayed or otherwise applied over the entire inner layer 61 and dried to form a thin continuous layer or coating constituting the nylon barrier 13 which is substantially impermeable to fluid under pressure. A very thin coating of natural rubber, liquid cement, is now suitably applied over the entire nylon barrier layer 13 to provide an all-rubber tie ply 11b which facilitates a good bond between the nylon barrier 13 and the overlying reinforcement 12.

The reinforcement 12 is provided by suitably cementing and forming or wrapping the first or inner ply 15 once about the natural rubber tie ply 11b, which first ply 15 is desirably weftless or substantially weftless rayon cord fabric thinly coated, as by calendering, on both sides with suitable unvulcanized, natural rubber composition. The inner ply 15 has preferably three portions, that is spaced-apart opposite end portions 15a, 15a and an intermediate part 15c.

The intermediate portion 15c extends axially throughout the major portion of the length of the mandrel apparatus so as to include the central zone 58 and the cone shaped zones 59, 60 and terminates at positions indicated by the numeral 62 spaced axially inward from the hand nuts 49, 49 and adjacent the narrow end of the cone shaped zones 59, 60 as shown especially in Fig. 6. The rayon cords of the fabric in the portion 15c of the inner ply throughout the large diameter, cylindrical central zone 58 are inclined at an angle of about 20° to a laterally-disposed vertical plane perpendicular to and intersecting the longitudinal axis indicated by the numeral 63 of the mandrel apparatus, while the remaining cords of the portion 15c are permitted to adjust themselves to the inclination required to conform the inner ply 15 to the configuration of the cone shaped zones 59, 60 and the smaller diameter, cylindrical end zones 56, 57.

Each of the two end portions 15a, 15a of the inner ply 15 are formed of suitably coated, weftless rayon cord fabric wound about the mandrel apparatus at the end zones 56, 57 so as to extend axially from the positions 62, 62 at the termination of the portion 15c to the adjacent hand nut 49. However, the rayon cords at each end portion 15a, 15a are inclined about 45° to a laterally-disposed vertical plane perpendicular to and intersecting the longitudinal axis 63, which 45° inclination is required to facilitate the provision of the flanged ends 18, 19 of the hollow body 10.

The second or outer ply 14 of the reinforcement 12 is of suitable coated, weftless rayon cord fabric and is cemented and formed or wrapped about the inner ply 15 on the mandrel apparatus in a manner similar to that of the inner ply 15 except that the intermediate portion 14c terminates axially outward of the positions 62, 62 and at positions indicated by the numeral 64 to provide a lap joint at the ends of the outer and inner intermediate portions 14c, 15c. The cords in the intermediate portion 14c of the outer ply 14 throughout the central zone 58 are inclined at the same 20° angle as the cords of the inner ply 15 but in the opposite direction, so that the cords in the respective plies 14, 15 criss-cross one another to resist outward bulging. The opposite end portions 14a, 14a of the outer ply 14 are wrapped about the mandrel apparatus so that they extend between the termination at 64, 64 of the intermediate portion 14c to the adjacent hand nut 49. The rayon cords of the end portions 14a, 14a, like the cords of the portions 15a, 15a, are inclined about 45° for the same purpose, but in the opposite direction.

With the material of the hollow body 10 arranged on the mandrel apparatus as shown in Fig. 6, the hand nuts 49, 49 are next unscrewed from the tubular support 36 and then the L-shaped attaching-reinforcing rings 27, 28 are slipped beaded end first over the ends of the apparatus into overlying relation to the end portions 16, 17 of the hollow body 10 in the fully extended condition with the beads 29, 29 at the junctions of the cylindrical end zones 56, 57 with the cone shaped zones 59, 60, as shown in Fig. 7, the inner peripheral surfaces of the rings 28, 29 having a thin coating of suitable natural rubber liquid cement for lubricating and bonding purposes. With the flanges of the rings 27, 28 spaced inwardly from the ends of the hollow body 10, the assembled material of the hollow body 10 including the cord fabric end portions 15a, 14a and 15a, 14a of 45° cord inclination is then bent radially outward and axially inward against and cemented to the flanges. The 45° inclination of the cords at these upturned ends makes feasible such bending and conformance of the projecting end portions of the hollow body to the flanges of the rings.

The metal expander collars 45, 45 are then pulled and slid axially from beneath the flanged end portions 16, 17 and attaching-reinforcing rings of the hollow body 10, and replaced by the second expander collars 50, 50 as shown in Fig. 7, with the pins 54, 54 seated in the slots 37, 37 and with the tapered portions 53, 53 of the expander collars underlying and pressing radially outward against the elastic expander rings 48, 48. The hand nuts 49, 49 are again threadedly engaged with the tubular support 36 so as to clamp together the respective parts of the mandrel assembly shown in Fig. 7, whereby the thicker tapered portions 53, 53 of the expander collars 50, 50 not only urge the expander rings 48, 48 radially outward but increase the radial pressure thereof against the overlying material of the hollow body 10 so as to press resiliently such overlying material against the overlying metal reinforcing rings 27, 28. This maintains positive contact and pressure between the end portions 16, 17 of the body 10 and the rings 27, 28 thereof during vulcanization.

The flange 51 of each expander collar 50 at its face positionable nearest the flanged end portions of the hollow body 10 is suitably coated with silicone oil, and has radially spaced-apart, circumferentially continuous grooves of triangular or other suitable section for molding sealing ribs on the flanges 18, 19 of the end portions 16, 17 of the body 10, and has a plurality of circumferentially spaced-apart apertures for receiving spacer bolt and nut fasteners 65. When the spacer bolt fasteners 65 extend through the flanges 51, 51 and apertures in the reinforcing rings 27, 28 and the flanges 18, 19 of the hollow body 10 as shown in Fig. 7, they function to draw together the reinforcing rings 27, 28 and the flanged expander collars 50, 50 until the shoulders of the spacer bolts seat against the flanges 51, 51 as shown in Fig. 7, and thus exert the desired amount of axially compressive force upon the flanges 18, 19 of the body 10 during its vulcanization.

Subsequent to the positioning and tightening of the spacer bolt and nut fasteners 65, the exposed outer surface of the hollow body 10 and at least part of the base of the L-shaped attaching-reinforcing rings 27, 28 are suitably coated with a liquid cement of resilient synthetic, oil-resistant rubber composition (oil-resistant rubbery copolymer of butadiene with acrylonitrile) having particles of electrically conductive substance therein to provide a thin conductive layer 11a to facilitate electrically grounding the connection and for providing an exterior oil and weather-resistant surface.

The assembly of the mandrel apparatus and the hollow body in its flanged, extended, unvulcanized condition shown in Fig. 7, is next placed within the space of a suitable steam chamber (not shown) and vulcanized under heat and pressure so as to integrally unite the fabric and elastic composition materials of the hollow body 10 and bond the attaching-reinforcing rings 27, 28 to the hollow body. Upon completion of the vulcanization and removal of the apparatus and body from the steam chamber, the bolt and nut fasteners 65 and the hand nuts 49, 49 are removed and then the flanged expander collars 50, 50 and the expansion rings 48, 48 are removed by sliding movement from the tubular support 36 and the hollow body 10.

The hollow body 10, by virtue of its elasticity, can then be pried or otherwise loosened from the tubular sectional mandrel 40 and the diametrically opposite center sections of the mandrel 40 are then pulled out axially from within the hollow body 10 and removed from the tubular support 36. The remeaining two side sections of the mandrel 40 are then similarly removed, thus freeing the hollow body 10 for removal from the mandrel apparatus.

The hollow body, as vulcanized, has the contoured shape shown in Fig. 7, providing the relatively large diameter, cylindrical intermediate portion 20 merging with the cone shaped portions terminating in the reduced diameter, flanged end portions 16, 17. The specific configuration of the vulcanized hollow body 10 shown in Fig. 1 is conveniently produced by applying axial force to the respective ring-reinforced, flanged ends of the body 10 shown in Fig. 7, so as to compel their movement toward one another, whereby the body at its tapered zones or cone shaped portions is folded axially upon itself and over the beads 29, 29 in a manner to provide the laterally compact S-fold portions 21, 22. The 20° opposite inclinations of the cords in the inner and outer plies 14 and 15 permit the cords to adjust themselves to accommodate the axial folding of the wall of the hollow body 10. This results in little or no inherent tendency of the end portions 16, 17 to axially separate, because the closely disposed overlapping portions of the folds resiliently resist separating movement of the end portions 16, 17 in the manner of a trouser cuff.

It has been found that the hereinabove described procedural steps of making the flexible connections can as a practical matter be best practiced by means of the hereinabove described mandrel apparatus, and can economically produce the flexible connection shown in Figs. 1 to 3, having the advantages of free floating axial functioning combined with universal joint functioning of the hollow body 10. The specific construction and arrangement of elements and the specific materials discussed hereinabove make feasible a flexible connection capable of resisting objectionable outward bulging under relatively high, internal fluid pressure of about 300 lbs. p. s. i. and capable of resisting deterioration from fuels such as gasoline, kerosene or the like passing through the bore of the connection when it joins adjacent ends of metal pipes constituting, for example, a flying boom for refueling aircraft in flight. The flexible connection by virtue of the relative axial and tilting movements of its spaced-apart end portions, facilitates connecting the flying boom of one aircraft to another airplane in flight, and at the same time accommodates relative movement of the aircraft, all of which are highly essential for successful utilization of the flying boom.

Variations may be made without departing from the scope of the invention as it is defined in the following claims.

I claim:

1. A collapsible mandrel apparatus for making a tubular flexible connection having axially spaced-apart peripherally continuous reversely curved fold portions and an enlarged diameter intermediate portion interconnecting said fold portions, said apparatus comprising a sectional mandrel having a plurality of longitudinally-extending sections in side-by-side abutting relation and in slidable relation one to the other providing a generally cylindrical intermediate portion interconnecting oppositely tapered end portions of the mandrel terminating in end faces thereof, said generally cylindrical portion being of sufficient length to provide for making said intermediate portion of said connection and each said tapered end portion being of sufficient length to provide for making one of the reversely curved fold portions of said connection in a fully and axially extended condition, an expander structure abutting and extending axially away from each end face of said mandrel in alignment therewith and in detachable relation thereto, said expander structure having a continuous annular outer surface of reduced peripheral dimension relative to that of said generally cylindrical intermediate portion of the mandrel and said expander structure comprising at said outer surface thereof elastic material adjacent the end face of said mandrel and rigid material spaced from such end face, and means for detachably holding and clamping said mandrel and said expander structures together in assembled relation.

2. A collapsible mandrel apparatus for making a tubular flexible connection having axially spaced-apart peripherally continuous reversely curved fold portions and an enlarged diameter intermediate portion interconnecting said fold portions, said apparatus comprising a tubular sectional mandrel having a plurality of longitudinally-extending sections in side-by-side abutting relation and in slidable relation one to the other providing an intermediate portion of said mandrel of substantially uniform outside diameter interconnecting oppositely tapered end portions of said mandrel terminating in end faces thereof, said intermediate portion of said mandrel being of sufficient length to provide for making said intermediate portion of said connection and each said tapered end portion of said mandrel being of sufficient length to provide for making one of said fold portions of said connection in a fully and axially extended condition, an expander collar at each end of said mandrel in alignment therewith having a recessed portion nearest and abutting the adjacent end face thereof, an expander ring of resilient rubber in the recess at each said expander collar to provide with said collar an outer supporting surface of substantially uniform diameter intersecting the adjacent end face of said mandrel and of reduced diameter relative to that of said intermediate portion of said mandrel, internal supporting means for detachably holding said mandrel and expander collars in alignment, and means for clamping said mandrel and said expander collars and said expander rings together in assembled relation.

3. A collapsible mandrel apparatus as defined in claim 2 in which said sectional mandrel at said intermediate portion thereof has a circumferentially continuous groove extending radially inward thereof and disposed substantially midway between said oppositely tapered end portions.

4. A collapsible mandrel apparatus for making a tubular flexible connection having spaced-apart peripherally continuous fold portions normally of generally S-shaped cross-section and an enlarged diameter intermediate portion interconnecting said fold portions, said apparatus comprising an elongate tubular support exteriorly threaded at each end thereof, a tubular sectional mandrel on said support having a plurality of sections extending longitudinally in side-by-side abutting relation from end to end of the mandrel and in slidable relation one to the other and to said support, said mandrel having a cylindrical intermediate portion of substantially uniform outside diameter terminating in oppositely tapered end portions with oppositely inclined end faces, said intermediate portion of said mandrel being of sufficient length to provide for making said intermediate portion of said connection and each said tapered end portion of said mandrel being of sufficient length to provide for making one of the S-fold portions of said connection in a fully and axially extended condition, an expander collar of reduced outside diameter relative to that of said intermediate portion of said mandrel, said expander collar being mounted on said support in slidable relation thereto at each end of said mandrel and having a tapered portion of reduced outside diameter abutting the adjacent inclined end face of said mandrel to provide therewith an annular recess and a portion of substantially uniform outside diameter extending away from said tapered portion, an expander ring of resilient rubber and truncated cone shape in section seated in said annular recess at each said expander collar and abutting the adjacent inclined end face of said mandrel and providing with said collar a continuous outer supporting surface of substantially uniform diameter and reduced diameter relative to that of said intermediate portion of said mandrel, and an interiorly threaded hollow nut at each end of said support engaging the threads thereof and abutting against the adjacent expander collar to clamp together said sectional mandrel and said expander collars and said expander rings in assembled relation on said support.

5. A collapsible mandrel apparatus for facilitating the assembly and vulcanizing of a flexible connection thereon, said apparatus comprising a mandrel body having axially spaced-apart end faces and a plurality of sections extending axially from end to end thereof in side-by-side abutting slidable relation one to the other providing an enlarged diameter intermediate portion of substantial length and connecting portions of gradually decreasing diameter merging smoothly with said intermediate portion and extending therefrom to said end faces of the mandrel body, expander means extending away from each end face in axial alignment with said mandrel body for underlying and supporting an end portion of the flexible connection to be assembled and vulcanized on said apparatus, and means for detachably holding the mandrel body and expander means in assembled relation, said expander means including resilient ring means and being adapted for applying through said ring means radially outward pressure against the overlying end portions of the flexible connection when the latter is assembled upon said mandrel apparatus and subjected to vulcanization.

6. A collapsible mandrel apparatus for making a tubular flexible connection having axially spaced-apart peripherally continuous reversely curved fold portions and an enlarged diameter intermediate portion interconnecting said fold portions, said apparatus comprising a tubular sectional mandrel having a plurality of longitudinally-extending sections in side-by-side abutting relation and in slidable relation one to the other providing an intermediate portion of said mandrel of uniform outside diameter interconnecting oppositely tapered end portions of said mandrel terminating in end faces thereof, said intermediate portion of said mandrel being of sufficient length to provide for making said intermediate portion of said connection and each tapered end portion of said mandrel being of sufficient length to provide for making one of said fold portions of said connection in a fully and axially extended condition, an expander collar at each end of said mandrel in alignment therewith having a recessed portion nearest and abutting the adjacent end face thereof and a radially outward-extending annular flange adjacent said recessed portion, an expander ring of resilient rubber in the recess at each said expander collar to provide with said collar an outer supporting surface of uniform diameter intersecting the adjacent end face of said mandrel and extending therefrom toward said flange of the expander collar and said supporting surface being of reduced diameter relative to that of said intermediate portion of said mandrel, internal supporting means for detachably holding said mandrel and expander collars in alignment, means for detachably interengaging and for preventing relative rotative movement of said expander collar and said internal supporting means, and means for clamping said mandrel and said expander collars and said expander rings together in assembled relation.

7. A collapsible mandrel apparatus for facilitating the assembly and vulcanizing of a flexible connection thereon, said apparatus comprising a rigid elongate tubular support, a rigid elongate tubular mandrel body about and along said support with oppositely inclined end faces spaced inwardly from the ends of said support and said mandrel body having a radially divided annular wall constituted by a plurality of sections extending side-by-side axially along the body in abutting slidable relation one to the other and in slidable relation to said support, said annular wall providing spaced-apart conical connecting portions of said mandrel body extending to said inclined end faces thereof and an enlarged diameter cylindrical portion of substantial length between and smoothly merging with said conical connecting portions, a tubular expander structure about and mounted on said support in slidable relation thereto and at each end thereof and presenting an inclined end face abutting against and mating with the adjacent inclined end face of said mandrel body, each said expander structure comprising a rigid expander collar of reduced outside diameter relative to that of said cylindrical portion of the mandrel body and having a relatively thin annular portion of axially inward tapered section disposed at said adjacent inclined end face of the mandrel body and a thicker portion including a radially outward flange adjacent said annular portion, and said expander structure comprising an expander ring of resilient rubber and relatively thick truncated cone shape in section overlying and seated upon the tapered annular portion of said collar, said expander ring presenting an outer cylindrical supporting surface intersecting said inclined end face of said expander structure and adapted to merge smoothly with the conical surface of the adjacent connecting portion of said mandrel body, said expander ring by virtue of its backing support by said tapered annular portion and its resiliency and increased thickness being adapted to maintain radially outward pressure at said cylindrical supporting surface thereof against an overlying end portion of the flexible connection when the latter is assembled upon said mandrel apparatus and subjected to vulcanization, and means mounted on and separably engaging said support at said ends thereof for axially clamping together said mandrel body and said expander structures in assembled detachable relation upon said support.

References Cited in the file of this patent

UNITED STATES PATENTS

| Number | Name | Date |
|---|---|---|
| 1,696,435 | Fraley | Dec. 25, 1928 |
| 2,246,977 | Kraft | June 24, 1941 |
| 2,524,662 | Harding | Oct. 3, 1950 |